United States Patent
Gutknecht

(10) Patent No.: US 8,375,587 B2
(45) Date of Patent: Feb. 19, 2013

(54) HELICAL INNER DIAMETER GROOVE JOURNAL BEARING

(75) Inventor: Daniel A Gutknecht, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/304,625

(22) Filed: Nov. 26, 2011

(65) Prior Publication Data

US 2012/0066908 A1  Mar. 22, 2012

Related U.S. Application Data

(62) Division of application No. 12/568,398, filed on Sep. 28, 2009, now Pat. No. 8,075,191.

(51) Int. Cl.
  *F16C 23/04* (2006.01)
(52) U.S. Cl. .................. 29/898; 29/898.03; 29/898.041
(58) Field of Classification Search .................. 29/898, 29/898.03, 898.04, 898.041, 898.042, 898.054, 29/898.056, 898.061, 898.062, 898.063; 384/276, 286–289, 291, 292, 294; 184/3.11
See application file for complete search history.

(56) References Cited

U.S. PATENT DOCUMENTS 6,729,763 B2 * 5/2004 Post et al. ...................... 384/213

* cited by examiner

*Primary Examiner* — David Bryant
*Assistant Examiner* — Christopher Besler
(74) *Attorney, Agent, or Firm* — Brian J. Pangrle

(57) ABSTRACT

A method includes providing a journal bearing blank that includes an axis, an inner surface disposed at an inner diameter, an outer surface disposed at an outer diameter, a first axial surface, a second, opposing axial surface, and a lubricant opening that extends between the inner surface and the outer surface; along the inner surface, milling a well that spans an azimuthal angle about the axis, milling an arm that spans an azimuthal angle about the axis and that extends from the well to the first axial surface of the journal bearing, and milling an opposing arm that spans an azimuthal angle about the axis and that extends from the well to the second axial surface of the journal bearing; and inserting the journal bearing in a bore of a turbocharger center housing. Various other devices, systems, methods, etc., are also disclosed.

17 Claims, 11 Drawing Sheets

US 8,375,587 B2

HELICAL INNER DIAMETER GROOVE JOURNAL BEARING

RELATED APPLICATIONS

This application is a divisional of U.S. patent application having Ser. No. 12/568,398, filed Sep. 28, 2009 (U.S. Pat. No. 8,075,191, issue date of Dec. 13, 2011), the application having Ser. No. 12/568,398 is incorporated herein by reference.

TECHNICAL FIELD

Subject matter disclosed herein relates generally to turbomachinery for internal combustion engines and, in particular, to bearing systems.

BACKGROUND

A conventional turbocharger typically relies on a center housing rotating assembly (CHRA) that includes a turbine wheel and a compressor wheel attached to a shaft rotatably supported in a center housing by one or more bearings. During operation, and directly after operation, heat energy from various sources can cause components to reach temperatures in excess of 1000 degrees Fahrenheit (538 degrees Celsius). Sources of heat energy include viscous shearing of lubricant films (e.g., lubricant between a rotating shaft and a bearing surface), viscous heating of inlet gas, exhaust heat, frictional heating, etc. Factors such as mass of the rotating components, lubricant properties, rotational speeds, etc., can affect heat generation.

High temperatures can cause carbonization of carbonaceous lubricants (e.g., oil), also known as coke formation or "coking". Coking can exasperate heat generation and heat retention by any of a variety of mechanisms and, over time, coke deposits can shorten the lifetime of a lubricated bearing system. For example, coke deposits can reduce bearing system clearances to a point where seizure occurs (e.g., between a bearing and a shaft), which results in total failure of the bearing system and turbocharger. Such phenomenon should be considered during development of turbochargers that operate at high rotational speeds or in high temperature environments and turbochargers with high mass rotating components. For example, use of high strength materials like titanium (e.g., titanium compressor wheels) for rotating components can increase mass of a rotating assembly and thus heat generation.

Various exemplary techniques described herein can reduce coking and, in general, reduce local maximum operational temperatures of a turbocharger's rotating assembly.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings where.

DETAILED DESCRIPTION

Figure 1:
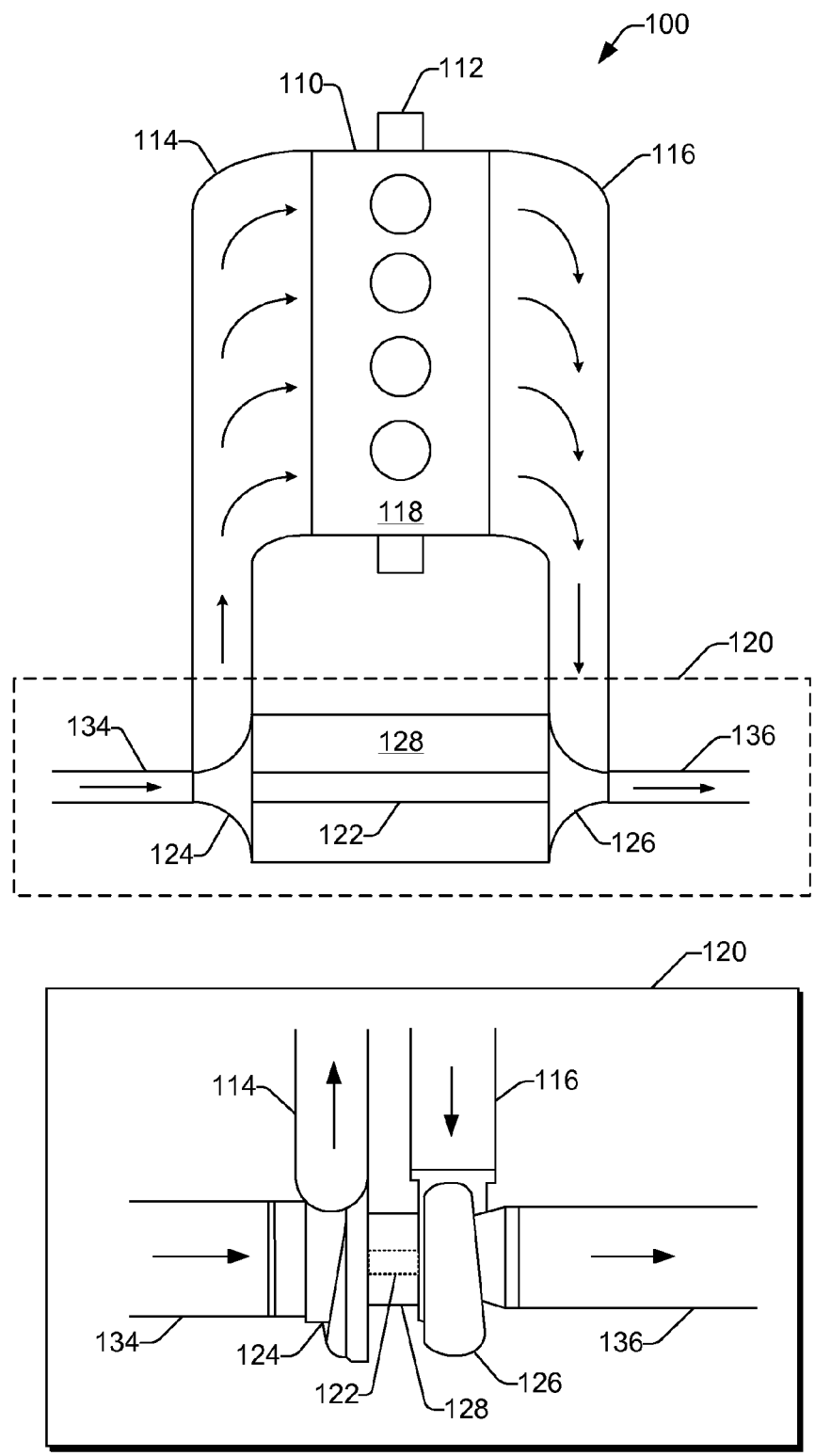
FIG. 1 is a diagram of a turbocharger and an internal combustion engine.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

Figure 2:
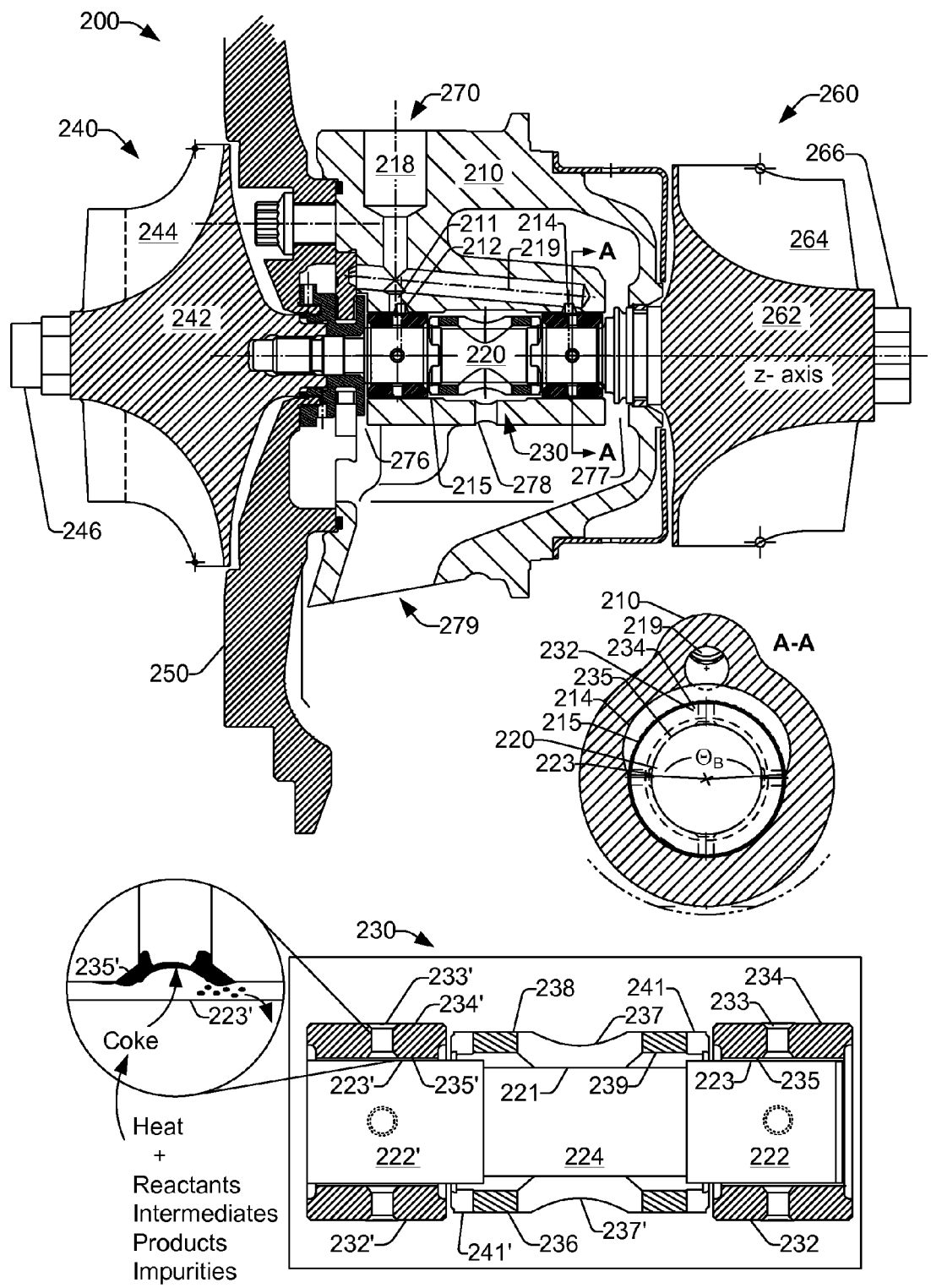
FIG. 2 is a series of cross-sectional views of a prior art center housing rotating assembly.

FIG. 2 shows several cross-sections of a prior art turbocharger assembly 200 suitable for use in the turbocharger 120 of FIG. 1. The cross-sections include a cross-section of a center housing rotating assembly, a cross-section through the assembly at along a line A-A and a close-up cross-section of the bearing system 230. In a cylindrical coordinate system, a bearing and center housing features may be defined with respect to radial, azimuthal (angular) and axial coordinates (e.g., r, Θ, z, respectively). See, e.g., Beyer, W. H., *CRC Standard Mathematical Tables*, 28th ed. Boca Raton, Fla.: CRC Press, p. 212, 1987.

The assembly 200 serves as a non-limiting example to describe various exemplary devices, methods, systems, etc., disclosed herein. The turbocharger 200 includes a center housing 210, a shaft 220, a compressor wheel 240 and a turbine wheel 260 where the compressor wheel 240 and the turbine wheel 260 are operably connected to the shaft 220.

The shaft 220 may be made of multiple components that form a single operable shaft unit or it may be a unitary shaft. The compressor wheel 240, the turbine wheel 260 and the shaft 220 have an axis of rotation substantially coincident with the z-axis. The center housing 210 supports a bearing system 230 that receives the shaft 220 and allows for rotation of the shaft 220 about the z-axis.

The compressor wheel 240 includes a hub 242 and a plurality of blades 244. The hub 242 terminates at a nose end 246, which may be shaped to facilitate attachment of the compressor wheel 240 to the shaft 220. The turbine wheel 260 includes a hub 262 and a plurality of blades 264. The hub 262 terminates at a nose end 266, which may be shaped to facilitate attachment of the turbine wheel 260 to the shaft 220.

The shaft 220 includes a compressor shaft portion that extends into a bore of the compressor wheel hub 242. While the example of FIG. 2 shows a "boreless" compressor wheel (i.e., no through bore), other types of compressor wheels may be used. For example, a compressor wheel with a through bore or full bore typically receives a shaft that accepts a nut or other attachment mechanism at the nose end 246 of the hub 242. Such an attachment mechanism may include features to accept a socket or a wrench (e.g., consider a hexagonal shape).

In general, a bore is a cylindrical hole having a diameter (or radius) as well as a length along an axis. For example, a bore may be manufactured using a drill with an appropriate drill bit where the drill and drill bit may be selected based on the type of material to be drilled. For example, where the compressor wheel 260 is made of aluminum, a manufacturing process will specify a drill and drill bit as well as drill rotational speed and axial motion for drilling a bore in aluminum. Drilling may occur prior to, during and/or after assembly of a center housing rotating assembly. Access to one or more surfaces for drilling may vary depending on the stage of assembly.

In FIG. 2, the center housing 210 includes a through bore 215 (for receipt of the bearing cartridge 230), a lubricant inlet bore 218 for forming a lubricant inlet 270 and a transverse lubricant bore 219 for forming a lubricant distribution path to a bore 211 that extends to a groove 212 at the through bore 215 and another lubricant distribution path that extends to a groove 214 at the through bore 215. The respective grooves 212, 214 may be less than a full circle (i.e., less than 360 degrees) as defined by an angle $\Theta_B$ about the axis of the bore 215. The cross-section of the bearing system 230 along the line A-A (turbine side) shows the angle $\Theta_B$, which may be the same for the compressor side (see description below with respect to flow and coking). As shown in FIG. 2, the through bore 215 may vary in diameter or radius, for example, the through bore 215 steps to a larger radius that defines a midsection disposed between its turbine end and compressor end.

The lubricant inlet bore 218 and the transverse lubricant bore 219 are formed by drilling the center housing 210 from respective outer surfaces (e.g., a top surface and a frontal or compressor side surface). The transverse lubricant bore 219 also supplies lubricant to the compressor side thrust collar. The bearing lubricant grooves 212, 214 may be formed by drilling the center housing 210 by accessing the through bore 215 via a turbine end and/or the compressor end of the center housing 210.

The housing 210 further includes intermediate lubricant outlets 276, 277 and 278 and a lubricant outlet 279. In general, lubricant flows through the center housing 210 under pressure, which may be partially facilitated by gravity (e.g., lubricant inlet 270 and lubricant outlet 279 may be substantially aligned with gravity) where upon shut down, gravity causes at least some draining of lubricant from the center housing 210.

In the arrangement of FIG. 2, during operation, lubricant flows to the bearing system 230 and forms various films. The close-up cross-section of the bearing system 230 shows a turbine side bearing 232, a compressor side bearing 232' and a bearing spacer 236. Films that form between the through bore 215 and the bearings 232, 232' and the bearing spacer 236 allow these components to "float" in the through bore 215.

As shown in the close-up cross-section of the bearing system 230, the shaft 220 has a turbine side portion 222 that cooperates with the turbine side bearing 232 (via bearing inner surface 235 and shaft surface 223), a compressor side portion 222' that cooperates with the compressor side bearing 232' (via bearing inner surface 235' and shaft surface 223') and a portion 224 (having surface 221) disposed between the turbine side portion 222 and the compressor side portion 222'. The compressor side of the assembly 230 is used to describe functional features in more detail, noting that the turbine side includes the same functional features.

The compressor portion 222' of the shaft 220 includes the journal surface 223' set at a journal surface radius and the compressor side bearing 232' includes the corresponding inner surface 235' set at a compressor bearing inner surface radius (e.g., bearing inner diameter "ID"). On the compressor side, lubricant enters the bearing 232' at an opening 233', which is fed primarily by the bearing lubricant path defined, in part, by the bearing lubricant bore 211 and the groove 212. During operation, heat energy causes heating of the lubricant, which in turn may cause coke formation (e.g., from reactants, intermediates, products, impurities, etc.). Coke may deposit on any of a variety of surfaces. For example, coke may deposit on the shaft 220 and/or the bearing 232' and diminish clearance between the journal surface 223' of the shaft portion 232' and bearing inner surface 235'. Alternatively, or in addition to, coke may deposit in the opening 233' and hinder flow of lubricant to the shaft 220. In such examples, coke may cause a reduction in heat transfer and an increase heat generation, which may lead to failure of the bearing system.

In the arrangement of FIG. 2, the bearing spacer 236 includes an outer surface 238 disposed at an outer surface radius, an inner surface 239 disposed at an inner surface radius, a pair of openings 237, 237', turbine side end notches 241 and compressor side end notches 241'. The entire bearing system 230 may rotate in the through bore 215 of the center housing 210 and the individual bearing system components 232, 232' and 236 may rotate with respect to each other. These components typically rotate at some fraction of the rotational speed of the shaft 220 (e.g., spacer rpm about ⅛ of shaft rpm, bearing rpm about ¼ of shaft rpm). Hence, the relationship between the bearing lubricant grooves 212, 214 of the center housing 210 and the openings 233, 233' of the journal bearings 232, 232' may change during operation of the center housing rotating assembly (CHRA). However, the arrangement of the grooves 212, 214 of the through bore 215 ensures that at least one bearing opening (see, e.g., openings 233, 233') of each bearing can receive lubricant, regardless of the rotational relationship between the center housing 210 and the bearings 232, 232'. In the example of FIG. 2, the bearings 232, 232' are each shown as having four openings set at an axial dimension (e.g., centered between opposing axial ends) and spaced azimuthally 90 degrees apart.

As mentioned in the Background section, coke formation can cause failure or shorten the life of a bearing system. Chemical reactions responsible for coke formation depend on temperature and time. For example, lubricant that reaches a high temperature for a short time may form coke and lubricant that reaches a lesser temperature for a longer time may form coke. An exemplary journal bearing includes lubricant flow paths defined by grooves that, when compared to the conventional journal bearing 232, can help reduce local temperature maxima of lubricant and/or help reduce residence time of lubricant adjacent a rotating shaft. As described below, an exemplary bearing can provide for increased volume of lubricant adjacent a lubricant film, increased volumetric flow of lubricant in and/or adjacent a lubricant film or a combination of increased volume of lubricant adjacent a lubricant film and increased volumetric flow of lubricant in and/or adjacent a lubricant film.

Exemplary bearings may be used in turbochargers that include a titanium compressor wheel and/or a heavy rotor. Such turbochargers are known to require so-called "high capacity" bearings to support the rotor mass and provide stable operation. Such turbochargers tend to have bearing systems that run much hotter as a result of their high load capacity. High shaft temperatures can cause coking of lubricant where coke buildup on the shaft and the bearings can lead to a loss of bearing internal clearances which ultimately leads to failure of the bearing system.

Various exemplary bearings are shown as floating bearings. While semi-floating bearing systems have been used to address high loads, semi-floating bearings tend to require quite high lubricant flow rates and are generally quite expensive (e.g., may increase bearing system cost by a factor exceeding 10:1). Further, semi-floating bearing systems tend to exhibit high shaft motion for a turbocharger mounted on an internal combustion engine (i.e., a high vibration environment).

As described herein, various exemplary journal bearings include a plurality of helical shaped ID bearing paths defined by grooves to provide increased lubricant flow without destabilizing a bearing system. Additionally, when implemented in a fully floating bearing system, an outer film forms with high stiffness and good damping characteristics, which helps to insure bearing stability in high vibration environments. While various characteristics associated with semi-floating bearings may be disadvantageous, an exemplary semi-floating bearing may include helical grooves.

A bearing in a bearing system can be viewed as having a loaded side and an unloaded side (i.e., a unidirectional radial force vector). As described herein, helical paths provide suitable lubricant flow to both loaded and unloaded sides of an exemplary bearing. Lubricant flow through an unloaded side of a bearing cools the bearing and the shaft. Such cooling acts to reduce local temperature maxima that can cause coking.

As described herein, a helical groove spans an angle about a bearing axis, for example, from a first angle at one axial end of the bearing to a second angle at an opposing axial end of the bearing. Further, a helical groove has a groove width, which may be defined by an angle or angles with respect to axial position. An exemplary bearing with helical grooves ensures that a shaft is always supported by the inner journal surface of the bearing. In other words, in a bearing with helical grooves, a shaft cannot "fall" into a groove (e.g., consider an axial groove in which the shaft may sit and thereby impede or alter lubricant flow). Yet further, for an exemplary bearing, a shaft passes over a helical groove area on one side of the bearing, clearance between the shaft and the bearing is being made by the pressure wedge on the other side of the bearing. Maintaining this separation insures that the clearance is maintained as the shaft passes by a helical groove and starts to develop pressure to maintain a load carrying pressure wedge. Consider that as a second side of a shaft reaches its helical path, a corresponding first side has re-established its full load carrying capability.

As described herein, shape of a helical groove ensures that lubricant can enter between a shaft and bearing efficiently to allow generation of a pressure wedge that supports loads being imparted to the bearing from the shaft. An exemplary groove shape may be a ramped surface (e.g., as used in thrust bearings). A turbocharger may include an external high pressure lubricant supply to overcome pressures in a bearing to thereby ensure that the exemplary bearings experience adequate lubricant flow to support the shaft and carry away heat.

As described herein, an exemplary bearing system keeps a shaft and the bearings cooler. Further, cooler lubricant typically has higher viscosity which is more effective at separating surfaces.

As described herein, an exemplary pair of bearings (or a unitary bearing) includes three helical grooves for a turbine side shaft journal surface and three helical grooves for a compressor side shaft journal surface. Such exemplary bearings (or bearing) are (is) optionally used for a smaller sized turbocharger. In such an example, outer surface grooves may be present to enhance flow of lubricant to openings that connect to the helical grooves. Such outer surface grooves may have an arc span measured in degrees. For example, each outer groove may have an arc span of about 15 degrees. A sum of the arc spans is typically less than 360 degrees; noting that where each bearing has an outer channel with an arc span of 360 degrees, higher shaft motion has been observed.

Figure 3:
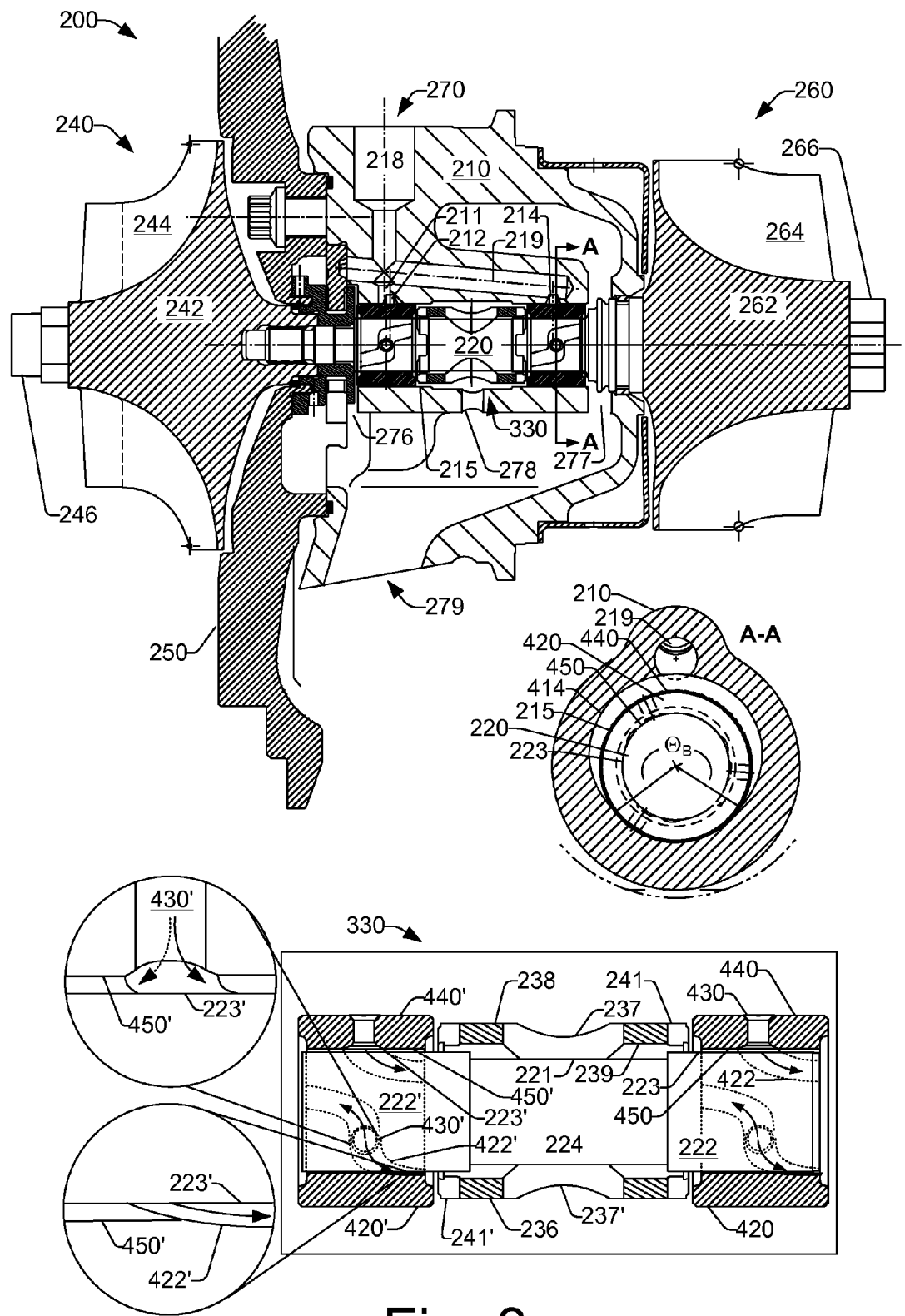
FIG. 3 is a series of cross-sectional views of an exemplary center housing rotating assembly that includes two exemplary journal bearings.

FIG. 3 shows an exemplary bearing system 330 in the center housing 210. A cross-sectional view of the bearing system 330 along a line A-A shows the bore 219 joining a semi-annular groove 414 (e.g., shaped differently than the groove 214), an exemplary journal bearing 420 and the shaft 220. The bearing 420 includes an outer surface 440 and an inner surface 450. During operation, a damping film forms between the outer surface 440 and the bore 215 of the housing 210 and a lubricant film forms between the inner surface 450 and the outer surface 223 of the shaft 220. As mentioned, the bearing 420 may float in the bore 215 as supported by the damping film. While the damping film and the lubricant film both participate in heat transfer, the damping film also acts to absorb vibration energy that may affect rotation of the shaft 220 in the bearing 420.

In FIG. 3, the close-up cross-section of the bearing system 330 shows a turbine side bearing 420, a compressor side bearing 420' and the bearing spacer 236. In this particular example, the bearing spacer 236 appears to have a smaller outer diameter than each of the bearings 420, 420' because the cross-section is taken across a section of the spacer 236 that includes flats.

In the example of FIG. 3, each bearing 420, 420' includes three helical grooves 422, 422' where each of the grooves 422, 422' extends an axial distance and spans an azimuthal angle (e.g., centered about a respective lubricant opening 430). An upper enlarged view, shown with respect to the compressor side bearing 420', shows diverging lubricant flow arrows emerging from an opening 430' of the bearing 420' while a lower enlarged view shows a lubricant flow arrow in a groove 422' of the bearing 420'. In the upper enlarged view, lubricant flow from the opening 430' bifurcates to flow along two opposing arms of the helical grooves 422'.

In the cross-sectional view along the line A-A, the respective grooves 212, 414 may be less than a full circle (i.e., less than 360 degrees) as defined by an angle $\Theta_B$ about the axis of the bore 215. The cross-section of the bearing system 330 along the line A-A (turbine side) shows the angle $\Theta_B$, which may be the same for the compressor side (see description below with respect to flow and coking). In the example of FIG. 3, the angle of the crescent shaped groove 414 in the bore 215 is sufficiently large to supply lubricant to two of the three openings of the bearing 420 (see openings at 11 o'clock and at 3 o'clock). In this arrangement, lubricant flows to two of the three openings in the bearing 420 and to respective helical grooves in the bearing 420. For the opening (at 7 o'clock) that is not aligned with the crescent shaped groove 414, pressures may result in no flow or even flow from a helical groove out of its corresponding opening (e.g. to a lubricant film space between the bearing 420 and the bore 215).

As described herein, to support a shaft in an exemplary bearing with helical grooves, the bearing either has a feature or features to ensure that lubricant can flow to two or more openings regardless of angular position of the bearing (e.g., an outer channel) or the bore of the housing has a feature or features to allow lubricant to flow to two or more openings regardless of angular position. As another alternative, an exemplary bearing may include features such as partial grooves on an outer surface of the bearing where each partial groove leads to a respective opening (see, e.g., FIG. 8 and FIG. 10). Such partial grooves may cooperate with a feature or features of a bore to ensure flow of lubricant to two or more openings (e.g., where each opening leads to a helical groove along an inner bearing surface). As described herein, an exemplary assembly includes a housing with a bore where the bore includes a lubricant groove spanning a sufficient angle about the bore to provide lubricant to at least two of three openings spaced at approximately 120 degree about a cylindrical wall of a bearing. In such an assembly, the lubricant groove may span about 240 degrees and may allow for lubricant to flow to all three openings (e.g., consider one opening at 12 o'clock aligned with a top center of the lubricant groove of a housing with the other two openings at 4 o'clock and 8 o'clock respectively).

Figure 4:
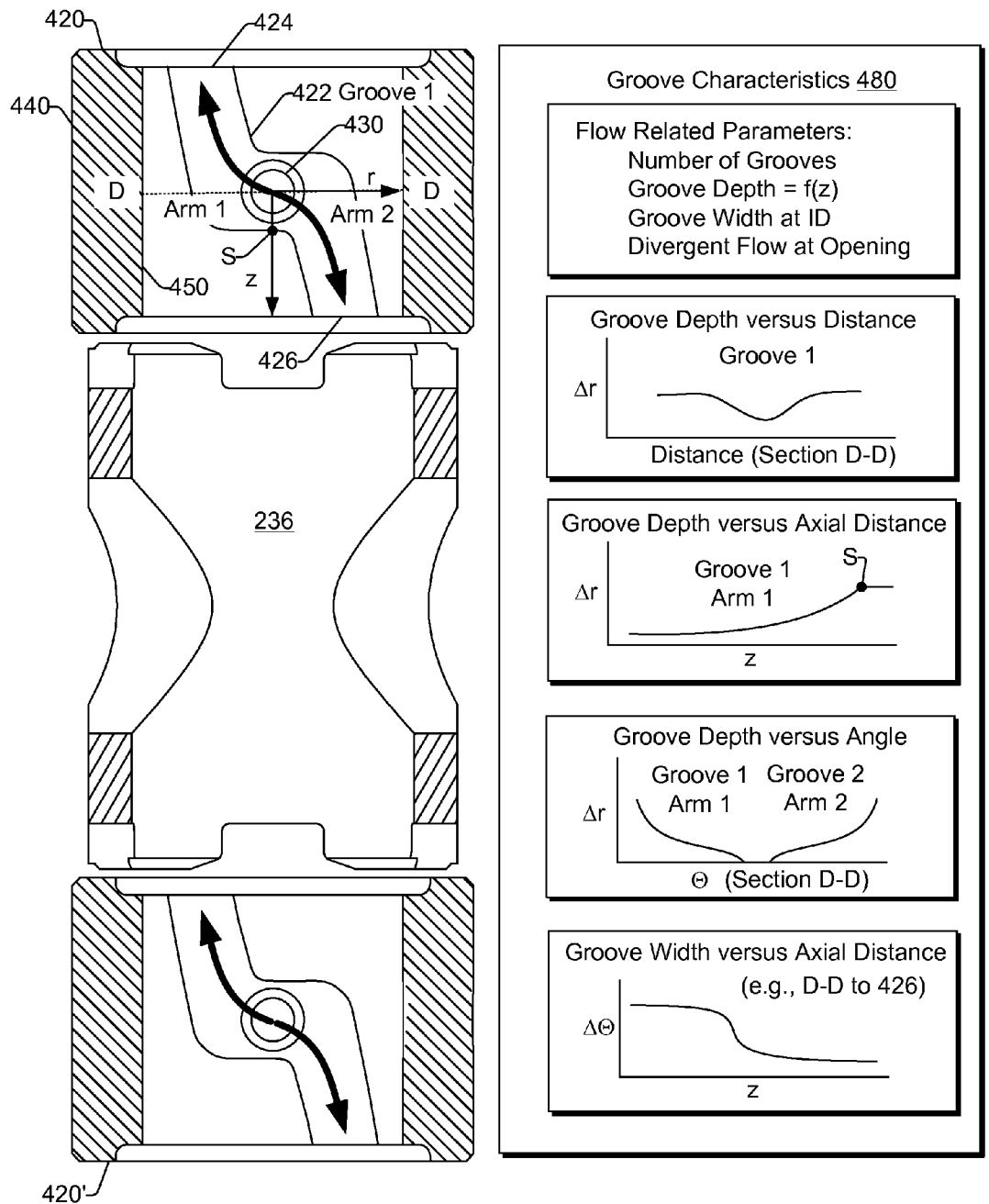
FIG. 4 is a cross-sectional view of the two journal bearings and a spacer of the assembly of FIG. 3.

FIG. 4 shows a cross-sectional view of the bearing system 330 of FIG. 3, without the shaft 220, along with exemplary groove characteristics 480. The groove characteristics 480 include flow related parameters such as number of grooves, groove depth (e.g., as a function of axial position), groove width at inner diameter of a journal bearing, and divergence at an opening (e.g., an aperture in a cylindrical wall of a bearing). An exemplary plot of groove depth for a cross-section along a line D-D shows depth around a central part of a groove 422 where the groove 422 branches to opposing arms (e.g., Groove 1). An exemplary plot of groove depth versus axial distance shows how an arm of a groove (e.g., Groove 1, Arm 1) may have a larger depth (e.g., measured as a radial dimension $\Delta r$) near an opening and a lesser depth approaching or at an axial end of the bearing. An exemplary plot of groove depth versus azimuthal angle shows how, over an angle of about 120 degrees, groove depth for arms of two grooves may vary (e.g., Groove 1, Arm 1 and Groove 2, Arm 2). In this example, the gap between the two arms represents a depth of 0 (i.e., inner diameter of the journal bearing 420). Another exemplary plot shows groove width as an azimuthal dimension ($\Delta\Theta$) versus axial distance. This plot shows how the width of the groove is large near the opening 430 (at D-D) and then diminishes at the transition to the individual arms (e.g., to the end 426).

As described herein, a balance exists between factors such as cross-sectional area for lubricant flow in a groove, area of a groove with respect to journal area, volume of a groove, number of groove, etc. For example, as area of a groove and number of grooves increases, journal area decreases (e.g., surface area at an inner diameter of a journal bearing). Also consider that as cross-sectional area of a groove increases along with groove depth, resistance to lubricant flow decreases, which may increase volumetric flow of lubricant and thereby increase heat removal and diminish the maximum temperature lubricant experiences. However, extreme channeling of lubricant flow should be avoided if it proves detrimental to formation and sustenance of an effective lubricant film. An exemplary method for selecting groove characteristics includes providing a minimum journal surface area and determining groove shape (e.g., groove area) and number of grooves to maintain at least the minimum journal surface area.

Figure 5:
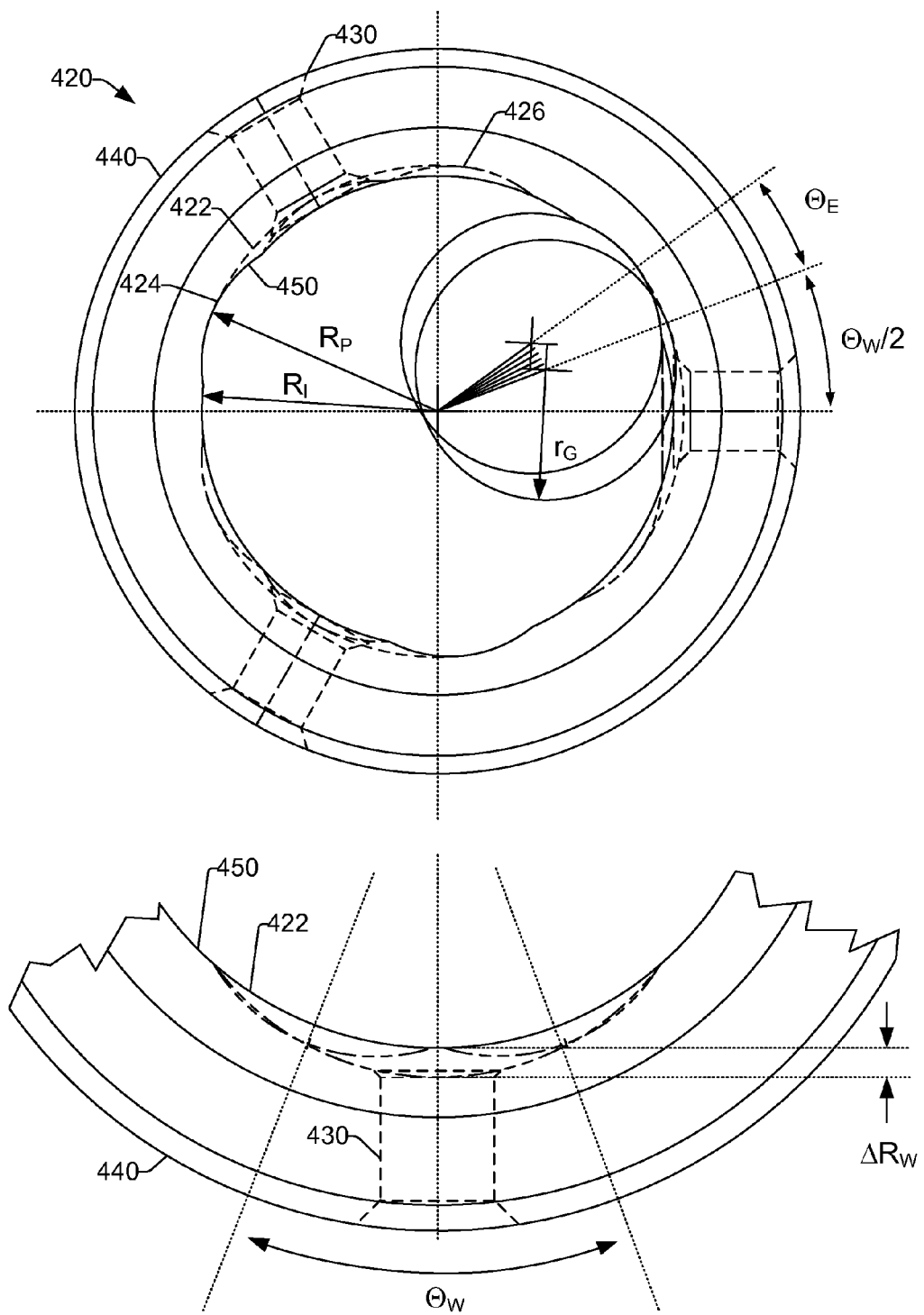
FIG. 5 is an end view of an exemplary journal bearing of FIG. 3 that includes three openings and three grooves.

FIG. 5 shows an end view of a particular example of the bearing 420 along with various dimensions. In the example of FIG. 5, each groove has a span of the sum of $\Theta_W$ and twice $\Theta_E$ where $\Theta_W$ is a well span adjacent an opening (see, e.g., opening 430) and $\Theta_E$ is an arm span, for two opposing and symmetric arms (see, e.g., groove ends 424, 426). FIG. 5 also shows how an arm of a groove may be formed using a fixed radius (e.g., a grind radius $r_G$). For example, a grinding tool may be positioned in a blank journal bearing and maneuvered axially and azimuthally to form an arm of a groove and then repeated to form an opposing arm of the groove. In FIG. 5, a groove depth radius is shown as $R_P$ while an inner radius is shown as $R_I$ where the groove depth radius $R_P$ determines in part lubricant volume and inner radius $R_I$ determines journal area for formation of a lubricant film with a shaft radius to $R_I$ thickness that supports a shaft.

As mentioned, groove depth may vary with respect to axial and/or azimuthal dimensions. In the example of FIG. 5, a maximum groove depth is shown for a groove 422 as being adjacent an opening 430 and being equivalent to a so-called well depth ($\Delta R_W$). An exemplary journal bearing includes three grooves with a groove span of about 36 degrees per arm for a total groove span of about 72 degrees. In this example, the well span may be about 42 degrees with each arm spanning an additional 15 degrees (e.g., a total groove span of 42 degrees+2*15 degrees). Where the three grooves are spaced at about 120 degrees, three axial bands of journal area (e.g., at $R_I$) exist with a span of about 48 degrees.

As described herein, an exemplary bearing assembly includes a turbine side journal bearing with helical grooves along an inner journal surface where each helical groove includes a lubricant opening and opposing arms where each arm terminates at a respective axial surface of the journal bearing, a compressor side journal bearing with helical grooves along an inner journal surface where each helical groove includes a lubricant opening and opposing arms where each arm terminates at a respective axial surface of the journal bearing, and a spacer to space the turbine side journal bearing and the compressor side journal bearing along an axis. In such an assembly, each helical groove can have a groove span defined by an azimuthal angle about the axis, for example, a groove span may include a well span and arm spans. Further, in such an example, the well span may exceeds the sum of the arm spans (see, e.g., example of FIG. 5).

An exemplary unitary bearing includes an integral spacer section disposed between two journal bearing sections. Where one journal bearing is not specific to a compressor side or a turbine side, such a unitary piece may be insertable via either end into a bore of a turbocharger housing. An exemplary assembly may include a spacer integral to one of the journal bearings. For example, an assembly may include an integral journal bearing and spacer piece and a separate journal bearing piece.

An exemplary bearing can include helical grooves where each groove includes opposing arms with an arm span defined as an azimuthal angle about an axis of the bearing. An exemplary bearing can include helical grooves where a groove has cross-sections, orthogonal to the axis, defined by one or more radii (e.g., consider a groove formed by a ball cutter tool). Accordingly, an arm of a helical groove may include a cross-section, orthogonal to the axis, defined by a radius. As described herein, an exemplary bearing may include helical grooves with symmetrical arms (e.g., symmetric by rotation of 180 degrees about an axis of a respective opening). An exemplary bearing may be symmetric such that assembly may occur in an orientationless manner, which can avoid errors in assembly.

An exemplary method for manufacturing a journal bearing can include providing or creating a bearing blank with a rough shape of the bearing, optionally including an axial channel around the outside diameter of the bearing. Next, the method includes drilling radial lubricant feed holes (e.g., openings) from the outside diameter to the inside diameter. A helical groove may be formed using a ball type cutter, for example, as used to chamfer an intersection of an opening to the bearing inner diameter. A cutter path can be programmed to cut a helical pattern to one side of the opening (e.g., a first arm), moved over the lubricant feed opening to connect with and chamfer the opening and then to continue and form the remainder of the helical groove on the opposite side of the bearing (e.g., a second arm). The bearing OD and ID surfaces may then be finished in a conventional manner.

In another example, a helical groove may be cut with a ball end mill and a four or five axis milling machine. Accordingly, a more capable machine may cut a more complicated geometry or path shape further enhancing function of a ramped surface. Same or similar types of geometry may be applied to a semi-floating bearing.

An exemplary method includes providing a journal bearing blank that has an axis, an inner surface disposed at an inner diameter, an outer surface disposed at an outer diameter, opposing axial surfaces and openings that extend between the inner surface and the outer surface; milling or grinding a well that spans an azimuthal angle about the axis; milling or grinding an arm that spans an azimuthal angle about the axis and that extends from the well to one of the axial surfaces of the journal bearing; milling or grinding an opposing arm that spans an azimuthal angle about the axis and that extends from the well to an opposing one of the axial surfaces of the journal bearing; and inserting the journal bearing in a bore of a turbocharger center housing. Such a method may include milling or grinding symmetric arms to form a symmetric journal bearing that allows for axial orientationless inserting of the journal bearing in the bore.

An exemplary method for heat transfer includes providing a bearing assembly in a turbocharger where the bearing assembly includes a turbocharger shaft supported by a turbine side journal bearing that includes lubricant openings and helical paths where each helical path includes a lubricant opening and opposing arms where each arm terminates at a respective axial surface of the journal bearing and a compressor side journal bearing that includes lubricant openings and helical paths where each helical path includes a lubricant opening and opposing arms where each arm terminates at a respective axial surface of the journal bearing; providing lubricant to at least two of the lubricant openings; at each of the at least two openings, bifurcating flow of lubricant to the opposing arms of a respective helical path; and transferring heat energy to lubricant flowing in the helical paths.

Figure 6:
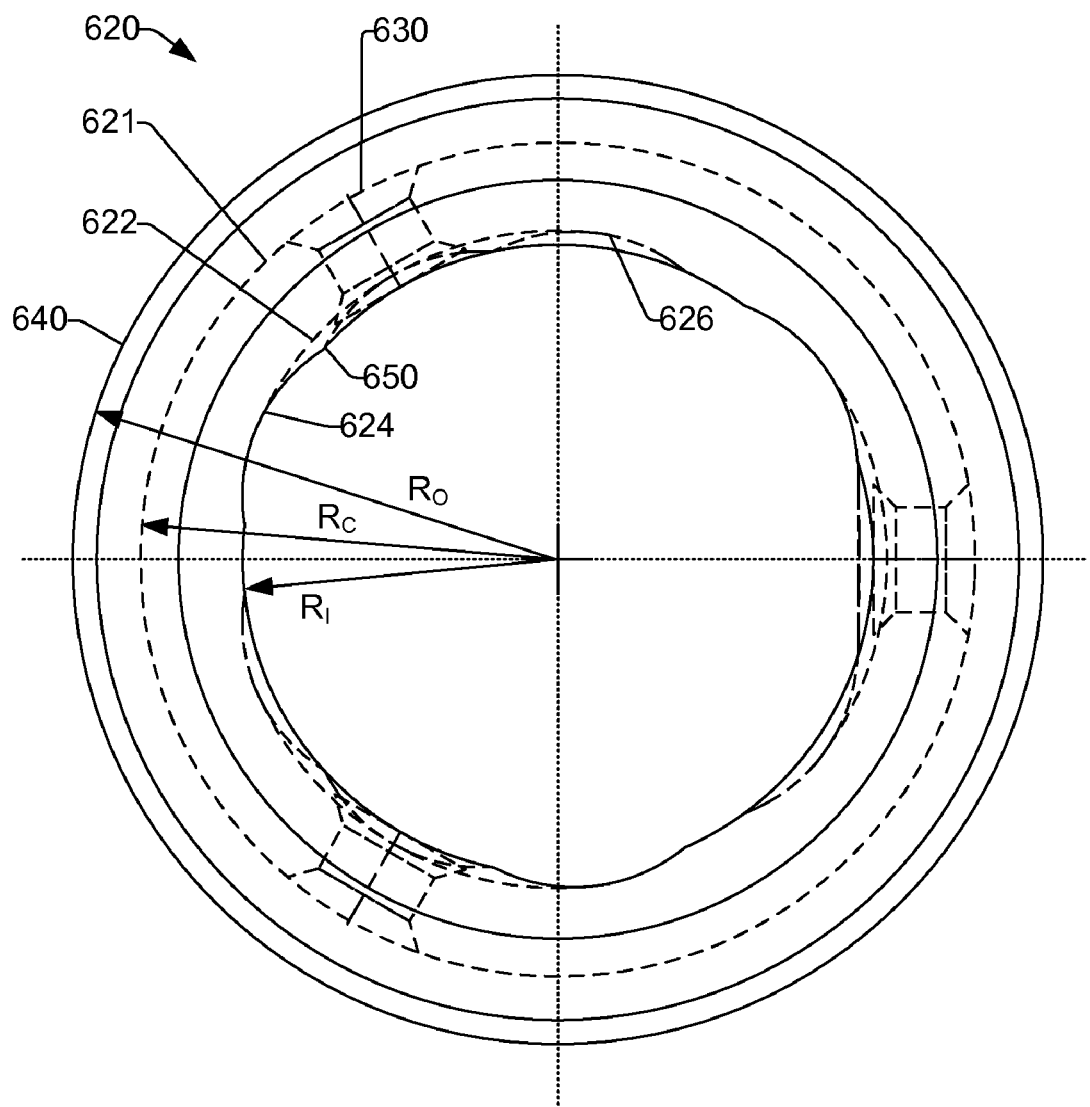
FIG. 6 is an end view of an exemplary journal bearing that includes an outer channel.

FIG. 6 shows an exemplary bearing 620 that includes an outer channel 621 at a channel radius $R_C$ along with features same or similar to those of the bearing 420. Specifically, the bearing 620 includes grooves 622 with arm ends 624, 626, openings 630 and outer surface 640 (at radius $R_O$) and an inner surface 650 (at radius $R_I$). In this example, the outer channel 621 can help provide a supply of lubricant to various openings. Such a feature may cooperate with and enhance supply of the semi-annular grooves 212, 214 of the center housing 210. However, channel characteristics should be determined as to not adversely impact damping of a journal bearing.

Figure 7:
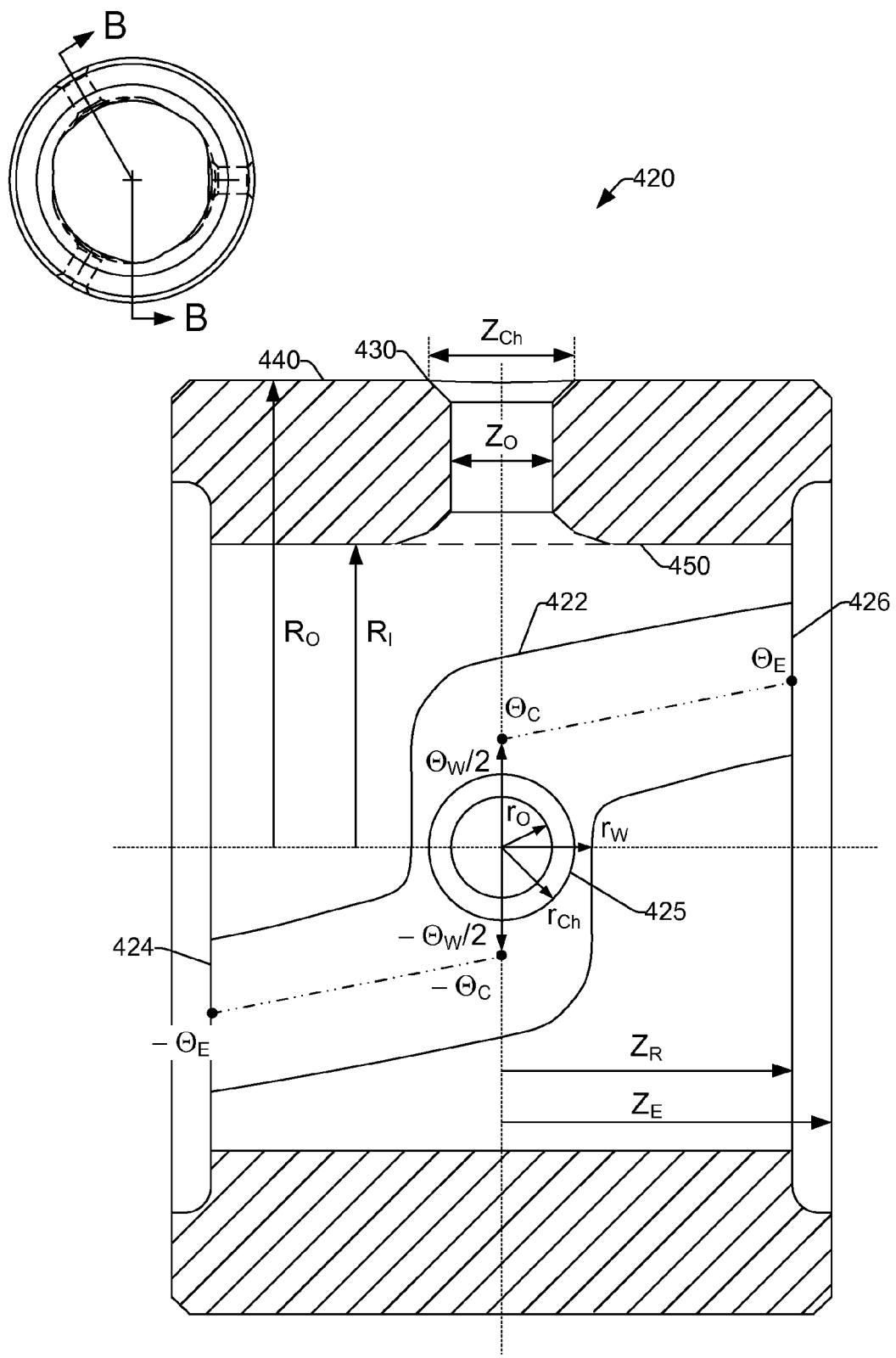
FIG. 7 is a cross-sectional view of an exemplary journal bearing of FIG. 3.

FIG. 7 shows a cross-sectional view of the exemplary bearing 420 along a line B-B. FIG. 7 shows various dimensions including well span $\Theta_C$, arm span $\Theta_E$, inner radius $R_I$, outer radius $R_O$, axial recess dimension $Z_R$, axial end dimension $Z_E$, axial opening dimension $Z_O$ (see also opening radius $r_O$) and axial chamfer dimension $Z_{Ch}$ (see also chamfer radius $r_{Ch}$).

Figure 8:
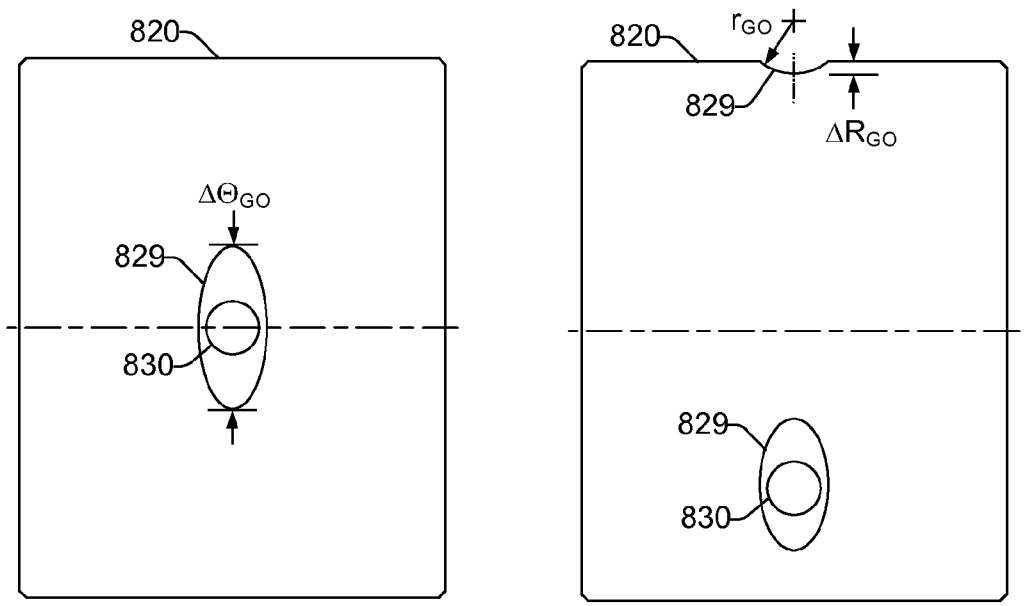
FIG. 8 is two side views and a cross-sectional view of an exemplary journal bearing that includes outer surface grooves to provide flow paths for lubricant openings.
Figure 8:
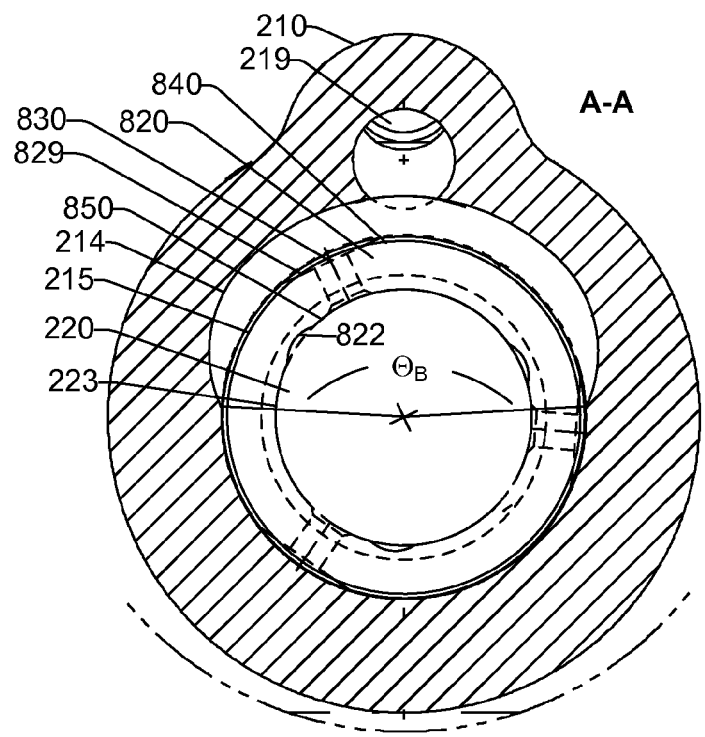

FIG. 8 shows two side views and a cross-sectional view of an exemplary journal bearing 820 that includes outer surface grooves 829 to provide flow paths for lubricant openings 830. In the example of FIG. 8, each of the outer surface grooves has an arc span of $\Delta\Theta_{GO}$ and a maximum radial depth $\Delta R_{GO}$ at or adjacent a respective opening 830. Such grooves may be milled or ground into the bearing 820 (e.g., consider a milling or grinding radius $r_{GO}$). As mentioned, such outer surface grooves can cooperate with one or more lubricant distribution paths of a housing. The cross-sectional view along a line A-A (see, e.g., FIG. 2) shows the exemplary bearing 820 in the housing 210 where the crescent shaped groove 214 spans an arc length of about 180 degrees. As described herein, the outer surface grooves 829 cooperate with the crescent shaped groove 214 to enhance lubricant flow to the helical grooves 822 along the inner journal surface of the bearing 820. In such a manner, an exemplary bearing (e.g., with three openings at 120 degree spacing) can effectively improve flow in a housing by extending the housing's lubricant distribution system. As described herein, an exemplary bearing can include one or more outer surface grooves configured to provide for flow of lubricant to or from one or more of openings.

Figure 9:
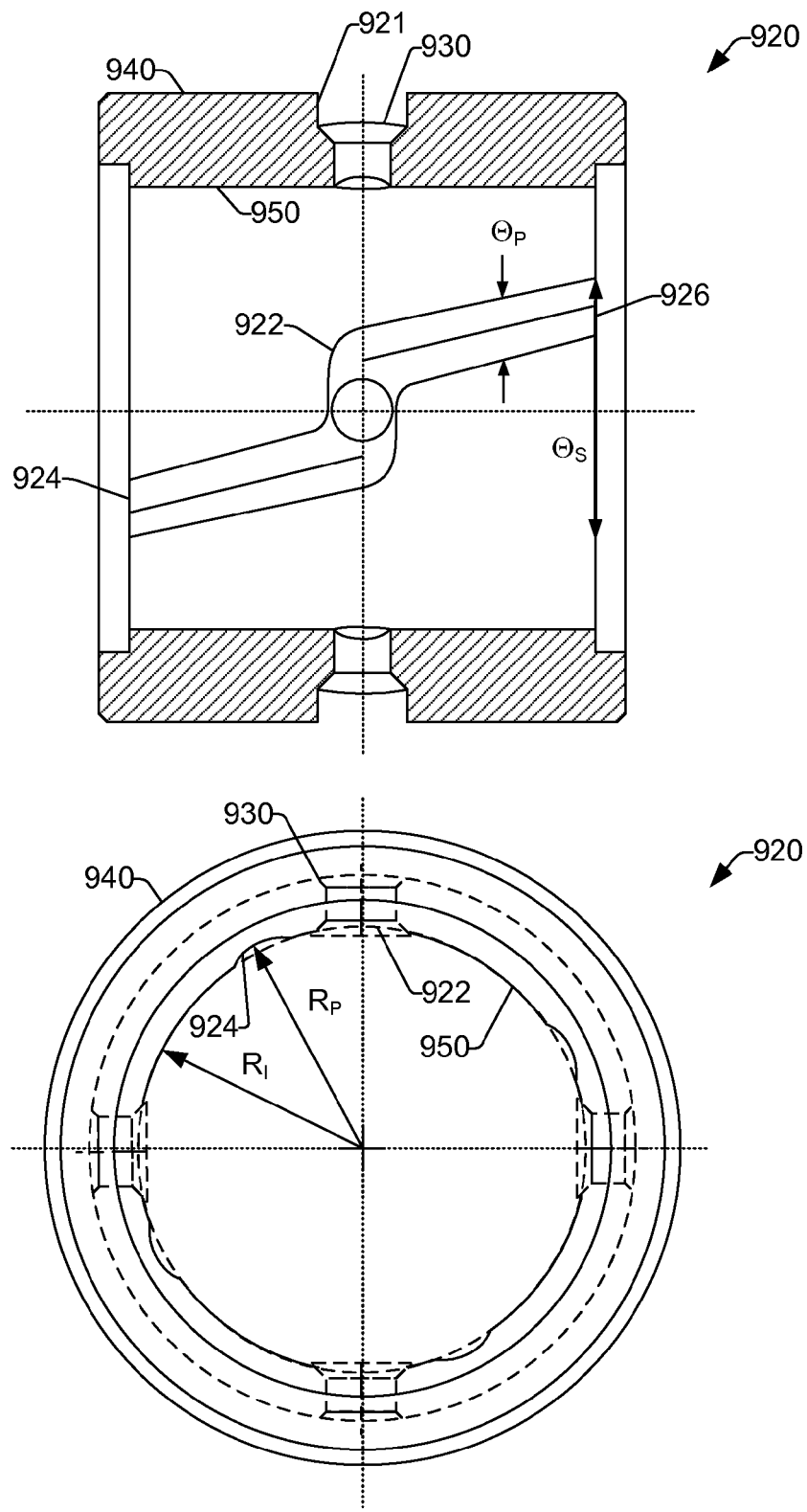
FIG. 9 is a cross-sectional view and an end view of an exemplary journal bearing that includes four openings and four grooves.

FIG. 9 shows an exemplary journal bearing 920 that includes four openings 930 and four grooves 922. Each groove 922 includes two arms that extend from a respective opening 930 to opposing ends 924, 926. In the example of FIG. 9, the bearing 920 includes end recesses and an outer channel 921. Where the number of grooves increases, groove width (e.g., $\Theta_P$) and groove span (e.g., $\Theta_S$) may decrease to maintain a desired journal area (e.g., surface area 950 disposed at $R_I$).

Figure 10:
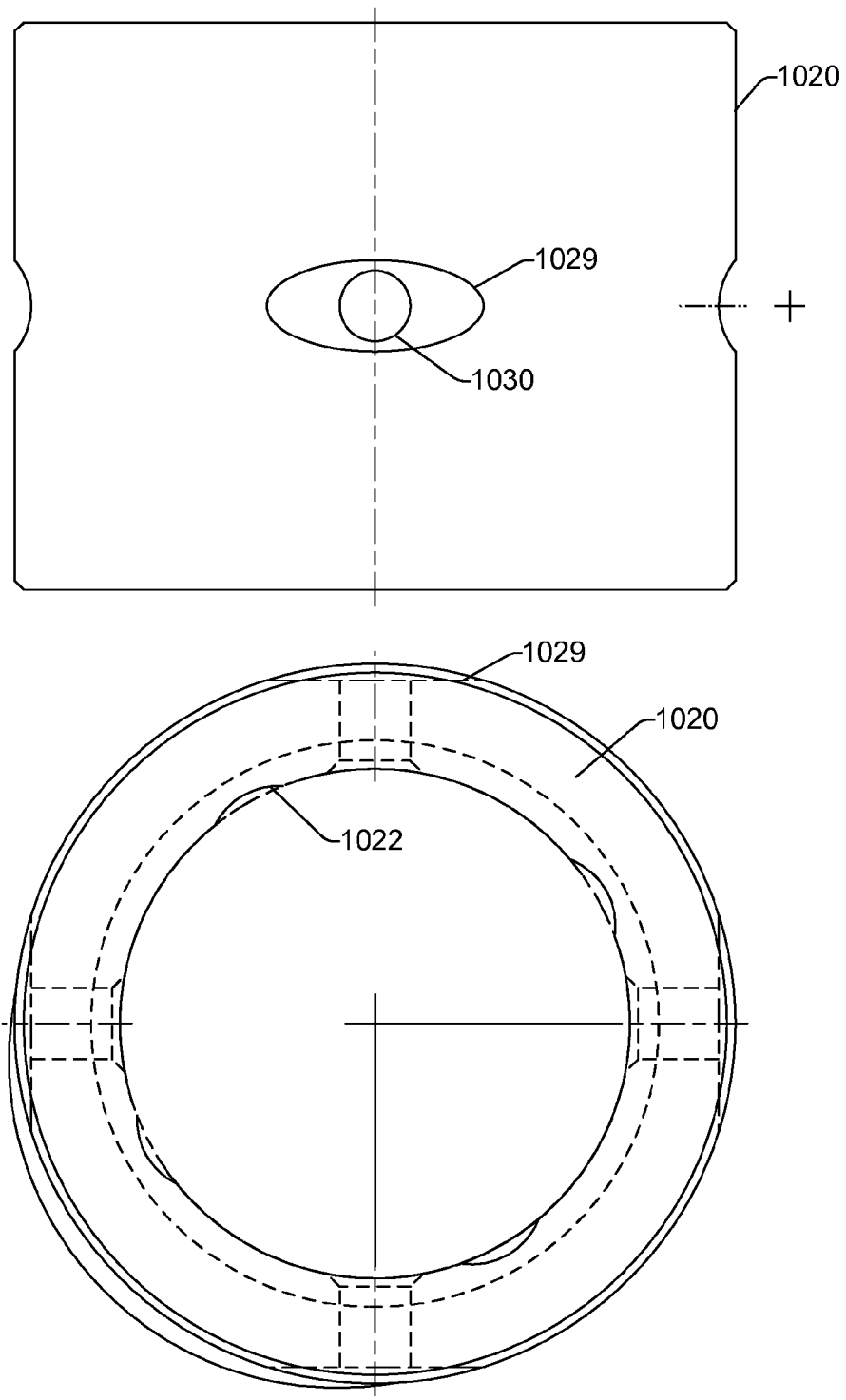
FIG. 10 is a side view and an end view of an exemplary bearing that includes four openings and four outer surface grooves to provide flow paths for the corresponding four openings.

FIG. 10 shows a side view and an end view of an exemplary bearing 1020 that includes an outer surface groove 1029 for each opening 1030. As shown in the end view, the outer surface groove 1029 provides a path for lubricant to flow to the opening 1030 and then to a helical path 1022. As mentioned, depending on pressures, reverse flow of lubricant may occur from the helical path 1022 to the opening 1030 and to the outer surface groove 1029. In such circumstances, the outer surface groove 1029 provides a larger outflow area compared to an opening without such a groove (or channel as in FIG. 9). The bearing 1020 of FIG. 10 aims to provide for adequate damping and shaft support.

Figure 11:
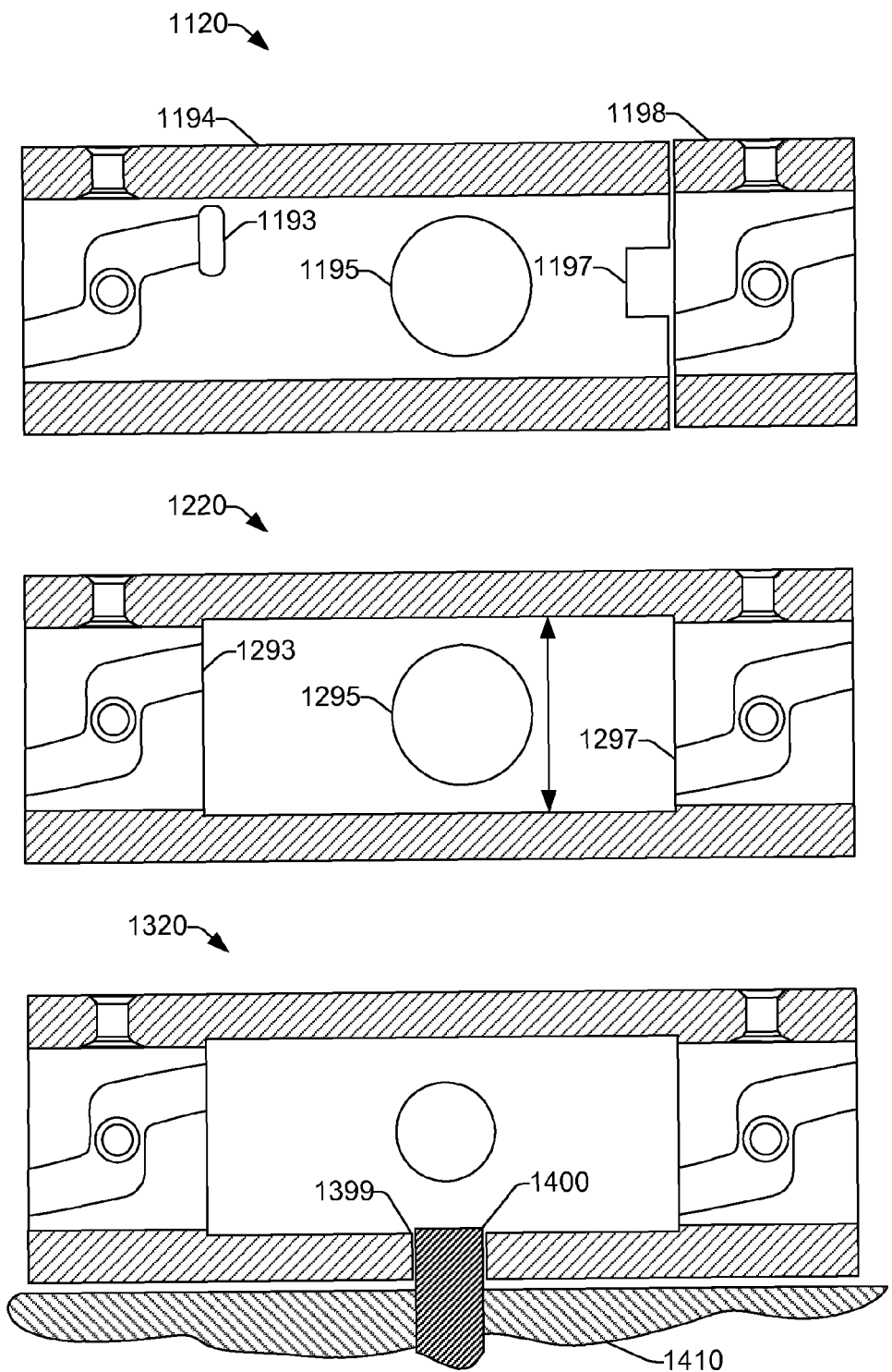
FIG. 11 is a cross-sectional view of an exemplary two piece assembly and cross-sectional views of two exemplary unitary bearings.

FIG. 11 shows an exemplary two piece assembly 1120, an exemplary unitary bearing 1220 and an exemplary unitary bearing 1320 with a receptacle 1399 for a locating pin 1400. The two piece assembly 1120 includes a journal and spacer piece 1194 and a journal bearing piece 1198. The journal and spacer piece includes various openings such as opening 1193, opening 1195 and end notch 1197. The unitary bearing 1220 includes steps in inner diameter at 1293 and at 1297 that allow for lubricant to exit the respective journal regions, for example, to drain from the bearing 1220 via an opening 1295 (noting that the bearing 1220 may include additional openings). The unitary bearing 1320 includes the receptacle 1399 configured for receipt of the locating pin 1400, which may be received via an opening in a housing 1410. Such an arrangement may allow for some radial movement of the bearing 1320 in a bore of the housing 1410 while limiting axial movement of the bearing 1320 in the bore of the housing 1410. Features shown in FIG. 11 for the assembly 1120, the unitary bearing 1220 and the unitary bearing 1320 are for purposes of illustration as a two piece assembly and a unitary bearing may include fewer, more or other features.

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A method comprising:
   providing a journal bearing blank that comprises an axis, an inner surface disposed at an inner diameter, an outer surface disposed at an outer diameter, a first axial surface, a second, opposing axial surface, and a lubricant opening that extends between the inner surface and the outer surface;
   along the inner surface, milling a well that connects to the lubricant opening and that spans an azimuthal angle about the axis wherein the well comprises a well depth;
   along the inner surface, milling an arm that spans an azimuthal angle about the axis and that extends from the well to the first axial surface of the journal bearing wherein the well depth exceeds an arm depth at the first axial surface;
   along the inner surface, milling an opposing arm that spans an azimuthal angle about the axis and that extends from the well to the second axial surface of the journal bearing wherein the well depth exceeds an arm depth at the second axial surface; and
   inserting the journal bearing in a bore of a turbocharger center housing.

2. The method of claim 1 wherein the milling an arm and the milling an opposing arm mill symmetric arms to form a symmetric journal bearing that allows for axial orientationless inserting of the journal bearing in the bore.

3. The method of claim 1 wherein the providing comprises providing a journal bearing blank for a semi-or fully floating turbocharger bearing.

4. The method of claim 1 wherein the providing a lubricant opening that extends between the inner surface and the outer surface comprises drilling the lubricant opening.

5. The method of claim 1 wherein the milling a well, the milling an arm and the milling an opposing arm form a helical groove.

6. The method of claim 1 wherein the milling an arm and the milling an opposing arm comprise ball cutter milling.

7. The method of claim 1 wherein the providing provides lubricant openings where each of the lubricant openings extends between the inner surface and the outer surface.

8. The method of claim 7 further comprising repeating the milling a well, the milling an arm and the milling an opposing arm with respect to each of the lubricant openings.

9. The method of claim 7 wherein the lubricant openings comprises three lubricant openings.

10. The method of claim 9 where the three lubricant openings comprise lubricant openings disposed at intervals of 120 degrees about the axis.

11. The method of claim 7 wherein the lubricant openings comprises four lubricant openings.

12. The method of claim 9 where the four lubricant openings comprise lubricant openings disposed at intervals of 90 degrees about the axis.

13. The method of claim 1 wherein the well spans an azimuthal angle centered on the lubricant opening.

14. A method comprising:
    providing a journal bearing blank that comprises an axis, an inner surface disposed at an inner diameter, an outer surface disposed at an outer diameter, a first axial surface, and a second, opposing axial surface;
    along the inner surface, milling a well that spans an azimuthal angle about the axis wherein the well comprises a well depth;
    along the inner surface, milling an arm that spans an azimuthal angle about the axis and that extends from the well to the first axial surface of the journal bearing wherein the well depth exceeds an arm depth at the first axial surface;
    along the inner surface, milling an opposing arm that spans an azimuthal angle about the axis and that extends from the well to the second axial surface of the journal bearing wherein the well depth exceeds an arm depth at the second axial surface;
    drilling a lubricant opening that extends between the inner surface and the outer surface and that connects to the well; and
    inserting the journal bearing in a bore of a turbocharger center housing.

15. The method of claim 14 wherein the milling an arm and the milling an opposing arm mill symmetric arms to form a symmetric journal bearing that allows for axial orientationless inserting of the journal bearing in the bore.

16. The method of claim 14 wherein the providing comprises providing a journal bearing blank for a semi-or fully floating turbocharger bearing.

17. The method of claim 14 wherein the milling a well, the milling an arm and the milling an opposing arm form a helical groove.

* * * * *